United States Patent
Jung

(10) Patent No.: US 10,334,102 B2
(45) Date of Patent: Jun. 25, 2019

(54) DEVICE AND METHOD FOR VOICE COMMUNICATION CONTROL IN FIXED-MOBILE CONVERGENCE SYSTEM

(71) Applicant: Jae-Hak Jung, Seoul (KR)

(72) Inventor: Jae-Hak Jung, Seoul (KR)

( * ) Notice: Subject to any disclaimer, the term of this patent is extended or adjusted under 35 U.S.C. 154(b) by 0 days.

(21) Appl. No.: 15/739,585

(22) PCT Filed: Jun. 8, 2016

(86) PCT No.: PCT/KR2016/006022
§ 371 (c)(1),
(2) Date: Dec. 22, 2017

(87) PCT Pub. No.: WO2017/007134
PCT Pub. Date: Jan. 12, 2017

(65) Prior Publication Data
US 2018/0316790 A1 Nov. 1, 2018

(30) Foreign Application Priority Data
Jul. 3, 2015 (KR) .................. 10-2015-0095093

(51) Int. Cl.
*H04W 4/60* (2018.01)
*H04M 3/42* (2006.01)
(Continued)

(52) U.S. Cl.
CPC ... *H04M 3/42246* (2013.01); *H04M 3/42042* (2013.01); *H04M 3/42102* (2013.01);
(Continued)

(58) Field of Classification Search
CPC ....... H04W 8/26; H04W 28/22; H04W 28/24; H04W 48/18; H04W 88/06; H04W 4/16; H04W 4/60; H04M 15/00; H04M 15/8044; H04M 15/8055; H04M 15/8061; H04M 15/8088; H04M 3/42042; H04M 3/42102
See application file for complete search history.

(56) References Cited

U.S. PATENT DOCUMENTS

2007/0274292 A1* 11/2007 Schneider ......... H04L 29/06027
370/352
2007/0291733 A1* 12/2007 Doran ..................... H04L 12/66
370/352
(Continued)

FOREIGN PATENT DOCUMENTS

| KR | 10-2008-0037376 A | 4/2008 |
| KR | 10-2008-0064774 A | 7/2008 |

(Continued)

OTHER PUBLICATIONS

International Search Report dated Aug. 31, 2016 for PCT/KR2016/006022.

*Primary Examiner* — Jean A Gelin
(74) *Attorney, Agent, or Firm* — Hauptman Ham, LLP

(57) ABSTRACT

The present invention provides an apparatus and method for a voice communication control in a fixed-mobile convergence system, which can efficiently control, at the time of providing a fixed-mobile convergence service in the fixed mobile convergence system, a call path for a voice communication outgoing from or incoming to a user terminal, thereby optimizing call cost and call quality.

4 Claims, 6 Drawing Sheets

(51) Int. Cl.
*H04M 7/00* (2006.01)
*H04M 15/00* (2006.01)
*H04W 4/16* (2009.01)
*H04W 88/06* (2009.01)

(52) U.S. Cl.
CPC ......... *H04M 7/0027* (2013.01); *H04M 15/00* (2013.01); *H04M 15/8044* (2013.01); *H04M 15/8055* (2013.01); *H04M 15/8061* (2013.01); *H04M 15/8088* (2013.01); *H04W 4/16* (2013.01); *H04W 4/60* (2018.02); *H04W 88/06* (2013.01)

(56) References Cited

U.S. PATENT DOCUMENTS

| | | | | |
|---|---|---|---|---|
| 2008/0081615 A1* | 4/2008 | Ninagawa | ............. | H04W 36/30 |
| | | | | 455/428 |
| 2008/0123834 A1* | 5/2008 | Brown | .................. | H04Q 3/005 |
| | | | | 379/221.02 |
| 2009/0086742 A1* | 4/2009 | Ghai | ..................... | H04W 36/14 |
| | | | | 370/401 |
| 2010/0040216 A1* | 2/2010 | Chida | ..................... | H04M 1/57 |
| | | | | 379/142.17 |
| 2010/0151868 A1* | 6/2010 | Shinozaki | ......... | H04M 3/42059 |
| | | | | 455/445 |
| 2011/0244836 A1* | 10/2011 | George | ............... | H04M 3/4234 |
| | | | | 455/414.1 |
| 2012/0238276 A1 | 9/2012 | Gupta et al. | | |
| 2013/0065571 A1* | 3/2013 | Fighel | ..................... | H04W 4/16 |
| | | | | 455/417 |
| 2013/0114511 A1* | 5/2013 | Ma | ........................ | H04W 76/10 |
| | | | | 370/328 |
| 2013/0258997 A1* | 10/2013 | Chen | ................. | H04W 36/0011 |
| | | | | 370/331 |
| 2014/0113604 A1* | 4/2014 | Kim | .................. | H04M 3/42042 |
| | | | | 455/415 |
| 2014/0141771 A1* | 5/2014 | Futamase | ......... | H04M 3/42212 |
| | | | | 455/426.2 |
| 2016/0066365 A1* | 3/2016 | Najafabadi | ......... | H04W 40/248 |
| | | | | 455/432.3 |

FOREIGN PATENT DOCUMENTS

| KR | 10-2008-0095421 A | 10/2008 |
|---|---|---|
| KR | 10-2012-0058493 A | 6/2012 |

* cited by examiner

DEVICE AND METHOD FOR VOICE COMMUNICATION CONTROL IN FIXED-MOBILE CONVERGENCE SYSTEM

CROSS REFERENCE TO RELATED APPLICATION

This application claims the priority of International Application No. PCT/KR2016/006022, filed on Jun. 8, 2016, which claims priority to Korean Application No. 10-2015-0095093, filed on Jul. 3, 2015. The entire disclosures of each of the above applications are incorporated herein by reference.

TECHNICAL FIELD

The present invention relates to a field of fixed-mobile convergent (FMC) technology, and more particularly to an apparatus and a method for controlling voice communication in a fixed-mobile communication system to optimize call charge and voice quality by efficiently controlling communication path (or telephone conversation path) for outgoing or incoming voice call of a user terminal in providing FMC service based on an FMC system.

BACKGROUND ART

In general, the technology of a fixed-mobile convergence (FMC) service, which uses a wireless local area network (e.g., WiFi network) indoors and a wireless wide area communication network (also called 'mobile communication network') such as 3G/LTE mobile network outdoors, provides terminals with a plurality of networks to access selectively for communication. In other words, the FMC service allows a mobile terminal to be used as a fixed telephone (an extension phone or an office telephone) regardless of whether it is indoors or outdoors.

Therefore, an FMC terminal has at least two wireless interfaces, which may be individually for a mobile communication network and a WiFi network. Using such FMC terminals, users can save service charge by using the FMC service through a WiFi network and carriers can reduce load on their mobile networks.

However, since a WiFi network is used by a large number of users in the same frequency band, there is a problem that the quality of real-time voice calls is not guaranteed due to serious interference. Whereas, an improved mobile communication network such as LTE network is able to provide an FMC service of stable quality for mobile terminals regardless of whether they are indoors or outdoors.

Recently, several carriers released a data rate plan that charges for data usage instead of offering unlimited numbers of voice calls, so that the cost of data usage tends to exceed the cost of voice calls. In this data-oriented communication environment, the cost (for example, the cost due to data consumed in a voice call) burden on subscribers of the FMC service increases. As a result, companies are reluctant to make decision on FMC adoption even though FMC ensures work mobility and increase of productivity.

DISCLOSURE

Problem to be Solved

It is an object of the present invention to provide an apparatus and a method for controlling voice communication in a fixed-mobile communication system to optimize call charge and voice quality by efficiently controlling telephone conversation path for outgoing or incoming voice call of a user terminal in providing FMC service based on an FMC system.

Technical Solution

In order to achieve the above-mentioned object, an apparatus for voice communication control in a fixed-mobile convergence (FMC) system according to one aspect of the present invention is integrated in an FMC server and may comprise: a first voice path setting unit configured for receiving a (outgoing) voice call originated from a user terminal over a voice telephone network and establishing a first voice path with the user terminal; a call information receiver configured for receiving, from the user terminal through a data network, the FMC extension phone number and a called telephone number of the called counterpart terminal for the voice call; a second voice path setting unit configured for establishing a second voice path with a called counterpart terminal over the voice telephone network based on the received telephone number; and a voice-path connecting unit configured for connecting the first voice path and the second voice path each other to provide telephonic communication between the user terminal and the called counterpart terminal. The voice telephone network may include at least one network among VoLTE (Voice over Long Term Evolution), 3G (3rd Generation), Internet telephone network and PSTN (Public Switched Telephone Network) while the data network may include at least one network among WiFi, Internet and LTE mobile network. The calling and the called numbers for the first voice path may be a native telephone number (NTN) of the user terminal and a telephone number of the FMC server, respectively.

In one example, the second voice path setting unit establishes the second voice path by making a call to the telephone number of the counterpart terminal from the FMC server over the voice telephone network. In this case, the calling number and the called number for the second voice path may be the FMC extension phone number of the user terminal and the telephone number of the counterpart terminal, respectively.

In another example, after notification that the counterpart terminal is being called from the FMC extension phone number of the user terminal is transmitted to the (telephone number of) counterpart terminal through the data network, the second voice path setting unit may establish the second voice path by accepting an incoming call to the FMC server if the counterpart terminal calls the FMC server over the telephone network according to the notification.

In order to achieve the above-mentioned object, an apparatus for voice communication control in a fixed-mobile convergence (FMC) system according to another aspect of the present invention is integrated in an FMC server and may comprise: a second voice path setting unit configured for accepting a (incoming) voice call, originated from a calling counterpart terminal, being made to a user terminal over a voice telephone network and establishing a second voice path with the counterpart terminal; a call information notifier configured for notifying the user terminal, through a data network, of the calling and the called numbers for the second voice path; a first voice path setting unit configured for establishing a first voice path with the user terminal over the voice telephone network; and a voice-path connecting unit configured for connecting the first voice path and the second voice path each other to provide telephonic communication between the user terminal and the calling counterpart terminal. The voice telephone network may include at least one network among VoLTE, 3G, Internet telephone network and PSTN while the data network may include at least one network among WiFi, Internet and LTE mobile network. The calling and the called numbers for the second voice path may be a telephone number of calling counterpart terminal and an FMC extension phone number of the user terminal, respectively.

In one example, the call information notifier notifies the user terminal, through the data network, that a call comes to the FMC extension phone number of the user terminal from the counterpart terminal, and the first voice path setting unit establishes the first voice path by accepting an incoming call to the FMC server being made over the voice telephone network by the user terminal. In this case, the calling and the called numbers for the first voice path are the NTN of the user terminal and the telephone number of the FMC server, respectively.

In another example, the first voice path setting unit establishes the first voice path by making a call to the user terminal from the FMC server over the voice telephone network, and the call information notifier notifies the user terminal, through the data network, that a call is made to the FMC extension phone number of the user terminal by the counterpart terminal. In this case, the calling and the called numbers for the first voice path are the telephone number of the FMC server and the NTN of the user terminal, respectively.

In order to achieve the above-mentioned object, an apparatus for voice communication control in a fixed-mobile convergence system according to another aspect of the present invention is integrated in a user terminal and may comprise: a first voice path setting unit configured for making a voice call originated from the NTN of the user terminal to a telephone number of an FMC server over a voice telephone network and establishing a first voice path with the FMC server, when a voice call event with the FMC extension phone number as the calling number is generated; a call information notifier configured for notifying the FMC server, through a data network, of a telephone number of a called counterpart terminal and a calling number (i.e., the FMC extension phone number) of the generated event; and a call serving unit configured for conducting telephonic communication with the called terminal through the first voice path and a second voice path that is established between the FMC server and the called terminal over a voice telephone network. The voice telephone network may include at least one network among VoLTE, 3G, Internet telephone network and PSTN while the data network may include at least one network among WiFi, Internet and LTE mobile network.

In order to achieve the above-mentioned object, an apparatus for voice communication control in a fixed-mobile convergence system according to another aspect of the present invention is integrated in a user terminal and may comprise: a first voice path setting unit configured for establishing a first voice path with an FMC server by accepting a voice call that is made from the FMC server to the NTN of the user terminal over a voice telephone network; a call information receiver configured for acknowledging the FMC extension phone number of the user terminal and a telephone number of a calling counterpart terminal, which are notified by the FMC server over a data network, as actual caller/called information; and a call serving unit configured for conducting telephonic communication with the calling terminal through the first voice path and a second voice path that is established between the FMC server and the calling terminal over a voice telephone network. The voice telephone network may include at least one network among VoLTE, 3G, Internet telephone network and PSTN while the data network may include at least one network among WiFi, Internet and LTE mobile network.

In order to achieve the above-mentioned object, an apparatus for voice communication control in a fixed-mobile convergence system according to another aspect of the present invention is integrated in a user terminal and may comprise: a call information receiver configured for being notified, through a data network from an FMC server, of generation of an event noticing that an incoming voice call to the FMC extension phone number of the user terminal from a calling counterpart terminal; a first voice path setting unit configured for establishing a first voice path by making a call to a telephone number of the FMC server from the NTN of the user terminal over a voice telephone network; and a call serving unit configured for conducting telephonic communication with the calling terminal through the first voice path and a second voice path that is established between the FMC server and the calling terminal over a voice telephone network. The voice telephone network may include at least one network among VoLTE, 3G, Internet telephone network and PSTN while the data network may include at least one network among WiFi, Internet and LTE mobile network.

In order to achieve the above-mentioned object, a method, conducted by a fixed-mobile convergence (FMC) server, for voice communication control in an FMC system according to one aspect of the present invention may comprise of the steps of: (a) receiving a (outgoing) voice call being made from a user terminal over a voice telephone network and establishing a first voice path with the user terminal; (b) receiving, from the user terminal through a data network, an FMC extension phone number of the user terminal and a called telephone number that are corresponding to the voice call; (c) establishing a second voice path with a called counterpart terminal over the voice telephone network based on the received called telephone number of the counterpart terminal; and (d) connecting the first voice path and the second voice path each other to provide telephonic communication between the user terminal and the called counterpart terminal. The voice telephone network may include at least one network among VoLTE (Voice over Long Term Evolution), 3G (3rd Generation), Internet telephone network and PSTN (Public Switched Telephone Network) while the data network may include at least one network among WiFi, Internet and LTE mobile network. The calling and the called numbers for the first voice path may be an NTN of the user terminal and a telephone number of the FMC server, respectively.

In one example, the step of (c) may establish the second voice path by making a call to the telephone number of the counterpart terminal from the FMC server over the voice telephone network. In this case, the calling number and the called number for the second voice path are the FMC extension phone number of the user terminal and the telephone number of the counterpart terminal, respectively.

In another example, the step of (c) may comprise: notifying (a telephone number of) the counterpart terminal, through the data network, that the counterpart terminal is being called from the FMC extension phone number of the user terminal; and establishing the second voice path by accepting an incoming call to the FMC server that is made over the voice telephone number by the counterpart terminal.

In order to achieve the above-mentioned object, a method, conducted by an FMC server, for voice communication control in an FMC system according to another aspect of the present invention may comprise of the steps of: (a) receiving a (incoming) voice call originated from a calling counterpart terminal to a user terminal over a voice telephone network and establishing a second voice path with the counterpart terminal; (b) notifying the user terminal, through a data network, of the calling and the called numbers for the second voice path as establishing a first voice path with the user terminal; and (c) connecting the first voice path and the second voice path each other to provide telephonic communication between the user terminal and the calling counterpart terminal. The voice telephone network may include at least one network among VoLTE, 3G, Internet telephone network and PSTN while the data network may include at least one network among WiFi, Internet and LTE mobile network. The calling and the called numbers for the second voice path may be a telephone number of the counterpart terminal and an FMC extension phone number of the user terminal, respectively.

In one example, the step of (b) comprises: (b-1) notifying the user terminal, through the data network, that a call comes to the FMC extension phone number of the user terminal from the counterpart terminal; and (b-2) establishing the first voice path by accepting an incoming call to the FMC server being made over the voice telephone network by the user terminal. In this case, the calling number and the called number for the first voice path are the NTN of the user terminal and the telephone number of the FMC server, respectively.

In another example, the step of (b) comprises: establishing the first voice path by making a call to the user terminal from the FMC server over the voice telephone network; and notifying the user terminal, through the data network, that a call is made to the FMC extension phone number of the user terminal by the counterpart terminal. In this case, the calling and the called numbers for the first voice path are the telephone number of the FMC server and the NTN of the user terminal, respectively.

In order to achieve the above-mentioned object, a method to be conducted by a user terminal for voice communication control in an FMC system according to another aspect of the present invention may comprise: (a) making a (outgoing) voice call originated from the NTN of the user terminal to a telephone number of an FMC server over a voice telephone network and establishing a first voice path with the FMC server, when a event of outgoing voice call with an FMC extension phone number as the calling number is generated; (b) notifying the FMC server, through a data network, of a called telephone number and the calling number (i.e., the FMC extension phone number) relating to the event as a called number and a calling number respectively; and (c) conducting telephonic communication with the called terminal through the first voice path and a second voice path that is established between the FMC server and the called terminal over a voice telephone network. The voice telephone network may include at least one network among VoLTE, 3G, Internet telephone network and PSTN while the data network may include at least one network among WiFi, Internet and LTE mobile network.

In order to achieve the above-mentioned object, a method to be conducted by a user terminal for voice communication control in an FMC system according to another aspect of the present invention may comprise: (a) accepting a voice call being made from an FMC server to the NTN of the user terminal over a voice telephone network to establish a first voice path with the FMC server; (b) acknowledging an FMC extension phone number of the user terminal and a telephone number of a calling counterpart terminal, which are notified through a data network from the FMC server, as actual caller/called information; and (c) conducting telephonic communication with the calling terminal through the first voice path and a second voice path that is established between the FMC server and the calling terminal over a voice telephone network.

In order to achieve the above-mentioned object, a method to be conducted by a user terminal for voice communication control in an FMC system according to another aspect of the present invention may comprise: (a) acknowledging, based on notification through a data network from an FMC server, that an event of an incoming voice call to the FMC extension phone number of the user terminal from a calling counterpart terminal is generated; (b) establishing a first voice path by making a call to a telephone number of the FMC server from the NTN of the user terminal over a voice telephone network; and (c) conducting telephonic communication with the calling terminal through the first voice path and a second voice path that is established between the FMC server and the calling terminal over a voice telephone network. The voice telephone network may include at least one network among VoLTE, 3G, Internet telephone network and PSTN while the data network may include at least one network among WiFi, Internet and LTE mobile network.

In order to achieve the above-mentioned object, a computer-readable recording medium containing a program, which can conduct in combination with hardware a method for voice communication control in the FMC system, may be provided according to another aspect of the present invention.

In order to achieve the above-mentioned object, an application, which can conduct in combination with hardware a method for voice communication control in the FMC system, may be provided in the form stored in a medium according to another aspect of the present invention.

In order to achieve the above-mentioned object, a computer program, which can cause a method for voice communication control in the FMC system to be executed in a computer, may be provided in the form recorded on a medium according to another aspect of the present invention.

MODE FOR INVENTION

Hereinafter, embodiments of the present invention will be described in detail with reference to the accompanying drawings.

Figure 1:
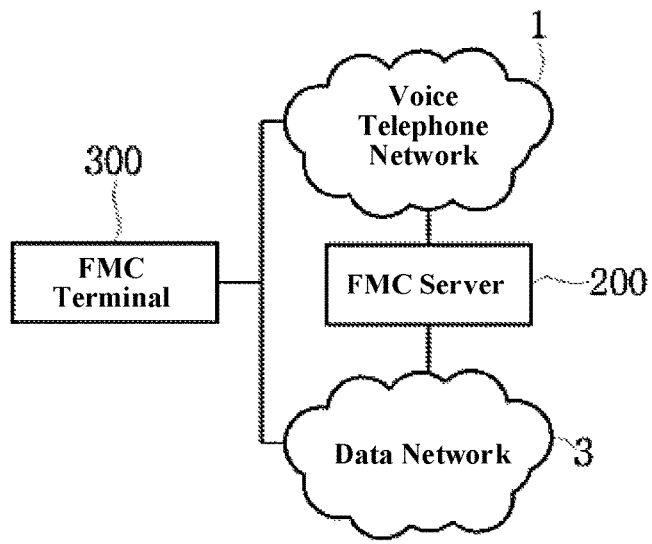
FIG. 1 is a block diagram of a system for voice communication control in an FMC system according to an embodiment of the present invention.

FIG. 1 is a block diagram of a system for voice communication control in an FMC (Fixed-Mobile Convergence) system according to an embodiment of the present invention. As shown in FIG. 1, the system may comprise a voice telephone network 1, a data network 2, an FMC server 200 and an FMC terminal 300.

The voice telephone network 1, a network over which voice communication can be served, may include at least one of networks such as VoLTE (Voice over Long Term Evolution) provided by LTE mobile network, 3G (3rd Generation), Internet telephone network and PSTN (Public Switched Telephone Network), etc.

The data network 3, a network over which data communication is possible, may include at least one of networks such as WiFi, Internet and LTE (Long Term Evolution) mobile network.

The FMC server 200 conducts control process for ordinary calls and extension phone calls originated from or arrived to the FMC terminal 300 and an internet telephone (not shown) by managing them as an extension subscriber. The FMC server 300 can be connected to the voice telephone network 1 via at least one wired telephone line and to the data network 3 via at least one LAN cable.

The FMC terminal 300, which is a user's (or subscriber's) terminal to be used in the FMC service, can be developed by installing a relevant application (called as 'FMC app' hereinafter) into a mobile terminal such as smartphone as a client application being capable of working with the FMC server 200. When the FMC app has been loaded and executed, the FMC terminal 300 is able to establish a voice path (VP) to the FMC server 300 through the voice telephone network 1 as well as communicate data with the FMC server 300 through the data network 3.

The FMC terminal 300 has both a unique mobile phone number (called as 'native telephone number (NTN) hereinafter) assigned by a carrier and an FMC extension phone number allocated by the FMC server 200.

Figure 2:
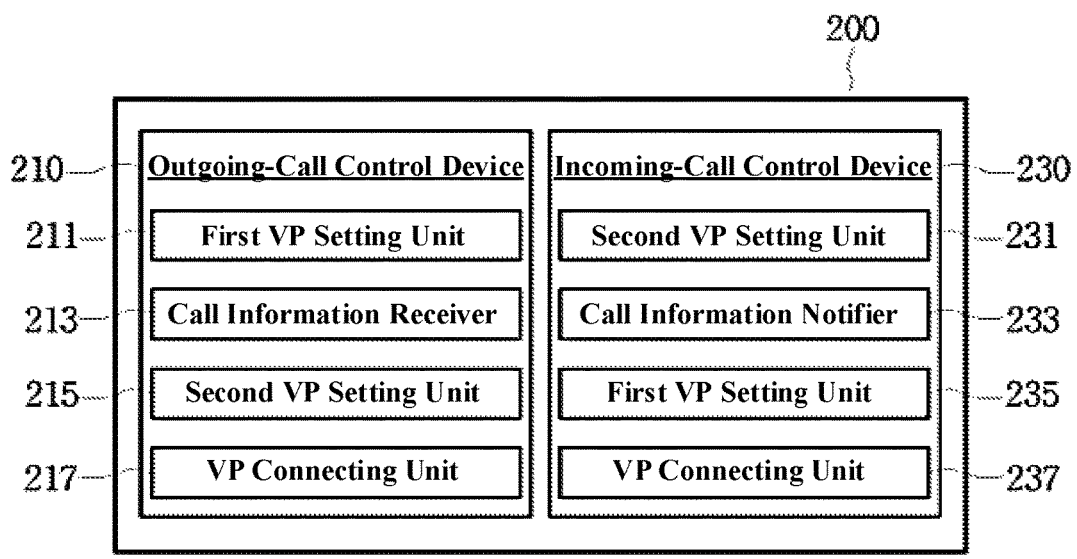
FIG. 2 is a block diagram of an apparatus for voice communication control in an FMC system according to one embodiment of the present invention.

FIG. 2 is a block diagram of an apparatus for voice communication control in the FMC system according to one embodiment of the present invention. The apparatus may be configured to be integrated into the FMC server 200 shown in FIG. 1 and may comprise an outgoing-call control device 210 and an incoming-call control device 230 as shown in FIG. 2.

The outgoing-call control device 210, which is for controlling a communication path of outgoing voice call when an event of the outgoing voice call is generated from the FMC terminal 300, may be configured to comprise a first voice-path (VP) setting unit 211, a call information receiver 213, a second VP setting unit 215 and a VP connecting unit 217.

The first VP setting unit 211, which is for establishing a voice communication path between the FMC terminal 300 and the FMC server 200 (called as first voice path hereinafter) when receiving an outgoing voice call originated from the FMC terminal 300 as a user's terminal over the voice telephone network 1, can establish the first voice path when receiving, over the voice telephone network 1, a call of which origination (or caller ID) and destination (or called number) are the NTN of the FMC terminal 300 and the telephone number of the FMC server 200, respectively.

The call information receiver 213, which is for receiving, from the FMC terminal 300 through the data network 3, a caller's FMC extension phone number and a called telephone number corresponding to a voice call for which the first voice path is formed, can receive through the data network 3 actual caller/called information including an FMC extension phone number, corresponding to the caller's NTN of the formed first voice path, and an actual called telephone number chosen by a subscriber when an event of an outgoing voice call is generated from the FMC terminal 300.

The second VP setting unit 215 is configured for establishing a voice communication path between the FMC server 200 and a called terminal at the other side (called as second voice path hereinafter) over the voice telephone network 1 based on the caller/called information (or call ID information) received through the call information receiver 213.

In one example, the second VP setting unit 215 may establish the second voice path by making a call, over the voice telephone network 1 to a terminal at the other side, of which origination and destination are an FMC extension phone number of the FMC terminal 300 (or a telephone number of the FMC server 200) and a telephone number of the called counterpart terminal respectively.

In another example, after notifying the called terminal at the other side over the data network 3 that the counterpart terminal is called from an FMC extension phone number of the FMC terminal 300, the second VP setting unit 215 establishes the second voice path as accepting a call that is, as the result of the notification, made to a telephone number of the FMC server 200 or an FMC extension phone number of the FMC terminal 300 over the voice telephone network 1 by the counterpart terminal.

The VP connecting unit 217 is for enabling telephonic communication between the FMC terminal 300, which is the calling part, and the called terminal at the other side by connecting the first voice path and the second one each other.

The incoming-call control device 230, which is for controlling a communication path of an incoming voice call when an event of the incoming voice call to the FMC terminal 300 is generated, may be configured to comprise a second VP setting unit 231, a call information notifier 233, a first VP setting unit 235 and a VP connecting unit 237.

The second VP setting unit 231, which is for establishing a voice communication path between the FMC server 200 and a calling terminal (not shown) at the other side (called as second voice path hereinafter) when an incoming voice call from the calling counterpart terminal to the FMC terminal 300 as a user's terminal is received over the voice telephone network 1, can establish the second voice path as accepting an incoming call made over the voice telephone network 1, where the origination (or caller ID) and the destination (or called number) of the incoming call are a telephone number of the calling terminal at the other side and an FMC extension phone number of the FMC terminal 300 or a telephone number of the FMC server 200, respectively.

The call information notifier 233, which is for notifying the FMC terminal 300, through the data network 3, of a caller ID and a called telephone number corresponding to the second voice path, can notify the FMC terminal 300, a called terminal, of caller/called information over the data network 3 when an event of an incoming voice call to the FMC terminal 300 is generated. The notified call ID information includes the telephone number of the calling terminal at the other side, which is the calling part of the established second voice path, and a called telephone number chosen by a caller at the other side.

The first VP setting unit 235 is configured for establishing a voice communication path between the FMC server 200 and the FMC terminal 300, a called terminal, (called as first voice path hereinafter) over the voice telephone network 1 based on the call ID information (namely, calling and called numbers) notified to the FMC terminal 300 by the call information notifier 233.

In one example, after the call information notifier 235 requests the FMC terminal 300 to call the FMC server 300 by notifying the FMC terminal 300 over the data network 3 that a call comes from a calling terminal at the other side to an FMC extension phone number of the FMC terminal 300, the first VP setting unit 235 establishes the first voice path as accepting a call that is, as the result of the notification, made from the NTN of the FMC terminal 300 to the telephone number of the FMC server 200 over the voice telephone network 1.

In another example, the first VP setting unit 235 establishes the first voice path by making a call, over the voice telephone network 1, from the telephone number of the FMC server 200 to the NTN of the FMC terminal 300, and the call information notifier 233 notifies the FMC terminal 300 through the data network 3 that a call comes from a calling terminal at the other side to an FMC extension phone number of the FMC terminal 300.

The VP connecting unit 237 is for enabling telephonic communication between the FMC terminal 300, which is the called part, and the calling terminal at the other side by making a connection between the first voice path and the second path each other.

Figure 3:
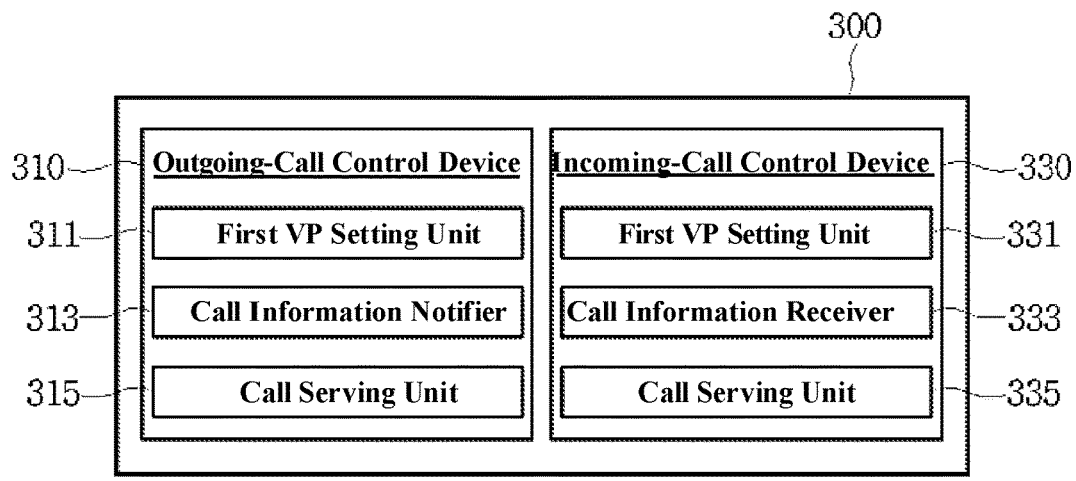
FIG. 3 is a block diagram of an apparatus for voice communication control in an FMC system according to another embodiment of the present invention.

FIG. 3 is a block diagram of an apparatus for voice communication control in an FMC system according to another embodiment of the present invention. The apparatus may be configured to be integrated into the FMC terminal 300 shown in FIG. 1 and may comprise an outgoing-call control device 310 and an incoming-call control device 330 as shown in FIG. 3.

The outgoing-call control device 310, which is for controlling communication path of outgoing voice call when an event of the outgoing voice call is generated in the FMC terminal 300, may be configured to comprise a first VP setting unit 311, a call information notifier 313, and a call serving unit 315.

The first VP setting unit 311 is configured for establishing a voice communication path between the FMC terminal 300 and the FMC server 200 (called as first voice path hereinafter) by making a voice call over the voice telephone network 1 from the NTN of the FMC terminal 300 to the telephone number of the FMC server 200 when an event of a voice call with an FMC extension phone number as the calling part is generated in the FMC terminal 300, namely a user's terminal.

The FMC terminal 300 conducts, as explained above, management and history display, etc. on outgoing/incoming calls based on the calling FMC extension phone number of the FMC terminal 300 and a telephone number of a called terminal at the other side which is chosen by a user of the FMC terminal 300. The FMC terminal 300 may execute the aforementioned establishment of the first voice path in background mode so that the user can not recognize the voice path establishing process.

The call information notifier 313 is configured for notifying the FMC server 200, through the data network 3, of a telephone number of the called terminal at the other side and the FMC extension phone number, which is the calling part, when an event of a voice call with the calling FMC extension phone number is generated as mentioned before.

The call serving unit 315 is configured for conducting telephonic communication with the called counterpart terminal through the first voice path, which is established by the first VP setting unit 311 between the FMC terminal 300 and the FMC server 200, and a second voice path established (refer to the second VP setting unit 215 of FIG. 2 and the related explanation thereof) over the voice telephone network 1 between the FMC server 200 and the called terminal at the other side.

The incoming-call control device 330, which is for controlling a communication path of an incoming voice call when an event of incoming voice call to the EMC terminal 300 is generated, may be configured to comprise a first VP setting unit 331, a call information receiver 333, and a call serving unit 335.

The first VP setting unit 331 is configured for establish a communication path between the FMC terminal 300 and the FMC server 200 (called as first voice path hereinafter) over the voice telephone network 1 when an event of an incoming call to the FMC terminal 300 is generated.

The call information receiver 333 is configured for receiving, from the FMC server 200 through the data network 3, a telephone number of a calling terminal at the other side and the FMC extension phone number of the FMC terminal 300 as actual caller/called information.

In one example, the first VP setting unit 331 establishes the first voice path after accepting a call which is made, over the voice telephone network 1, to the NTN of the FMC terminal 300 from the FMC server 200, and the call information receiver 333 acknowledges the calling and the called numbers selected actually by a caller with reference to a telephone number of the calling terminal at the other side and the FMC extension phone number that are received from the FMC server 200 through the data network 3.

In another example, after the call information receiver 333 acknowledges, from the notification of the FMC server 200 via the data network 3, that there is an event of an incoming call to the FMC extension phone number of the FMC terminal 300 from a (telephone number of) calling terminal at the other side, the first VP setting unit 331 establishes the first voice path by making a call, as the result of the call information receiver's acknowledgement, from the NTN of the FMC terminal 300 to the telephone number of the FMC server 200 over the voice telephone network 1.

The FMC terminal 300 conducts, as explained before, management and history display, etc. with respect to outgoing/incoming calls based on acknowledgement of the FMC extension phone number, which is chosen by a user at the other side, of the called FMC terminal 300 and a telephone number of the calling terminal at the other side. The FMC terminal 300 may execute the aforementioned establishment of the first voice path in background mode so that a user of the FMC terminal 300 can not recognize the voice path establishing process.

The call serving unit 335 is configured for conducting telephonic communication with the calling counterpart terminal through the first voice path, which is established over the voice telephone network 1 by the first VP setting unit 331 between the FMC terminal 300 and the FMC server 200, and a second voice path established (refer to the second VP setting unit 231 of FIG. 2 and the related explanation thereof) over the voice telephone network 1 between the FMC server 200 and the calling terminal at the other side.

Figure 4:
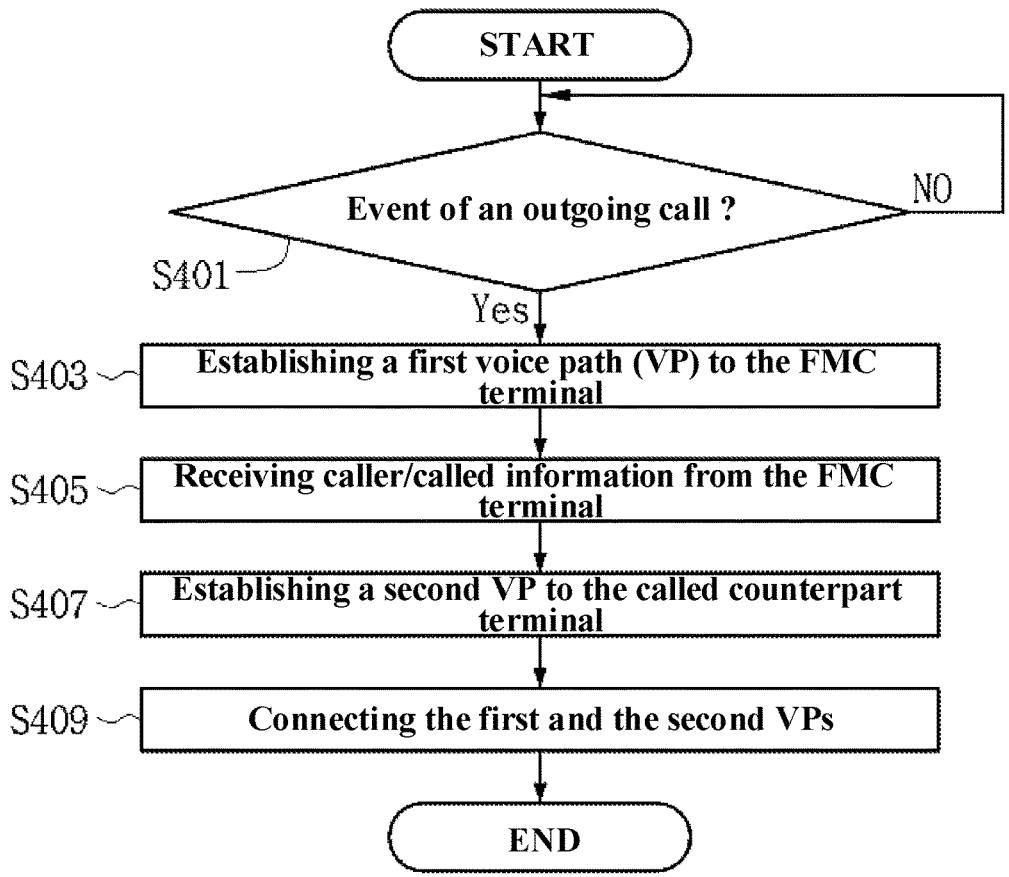
FIG. 4 is a flow chart of a method for voice communication control in an FMC system according to the first embodiment of the present invention.

FIG. 4 is a flow chart of a method for voice communication control in an FMC system according to one embodiment of the present invention. Being conducted by the outgoing-call control device 210 of the FMC server 200 shown in FIGS. 1 and 2, the method illustrated in FIG. 4 will be described along with their operations.

If a voice call is received over the voice telephone network 1 with the NTN of the FMC terminal 300, which is a terminal of a user (or subscriber), as the calling number and a telephone number of the FMC server 200 as the called number, the first voice path setting unit 211 of the outgoing-call control device 210 in the FMC server 200 determines that an event of an outgoing voice call is generated from the FMC terminal 300 (S401) and then establishes a first voice path between the FMC terminal 300 and the FMC server 200 (S403).

Subsequently, the call information receiver 213 receives, from the FMC terminal 300 through the data network 3, actual caller/called information including an FMC extension number, which is corresponding to the calling NTN of the first voice path established in the step S403, and an actually called telephone number chosen by a subscriber (S405), and the second VP setting unit 215 establishes a second voice path, based on the caller/called information received in the step S405, between the FMC server 200 and an actually called terminal (not shown) at the other side over the voice telephone network 1 (S407).

In the step S407, the second VP setting unit 215 may establish the second voice path by making a voice call, over the voice telephone network 1 to the counterpart terminal at the other side, with the FMC extension phone number of the FMC terminal 300 (or the telephone number of the FMC server 200) as the calling part and a telephone number of the counterpart terminal as the called number. Otherwise, after notifying the called terminal at the other side over the data network 3 that the terminal is called from the FMC extension phone number of the FMC terminal 300, the second VP setting unit 215 establishes the second voice path as accepting a call that is, as the result of the notification, made to the telephone number of the FMC server 200 or the FMC extension phone number of the FMC terminal 300 over the voice telephone network 1 by the actually called terminal.

Finally, the VP connecting unit 217 of the outgoing-call control device 210 in the FMC server 200 provides telephonic communication between the FMC terminal 300, which is the calling part, and the called terminal at the other side by making a connection between the first voice path established in the step S403 and the second one established in the step S407.

Figure 5:
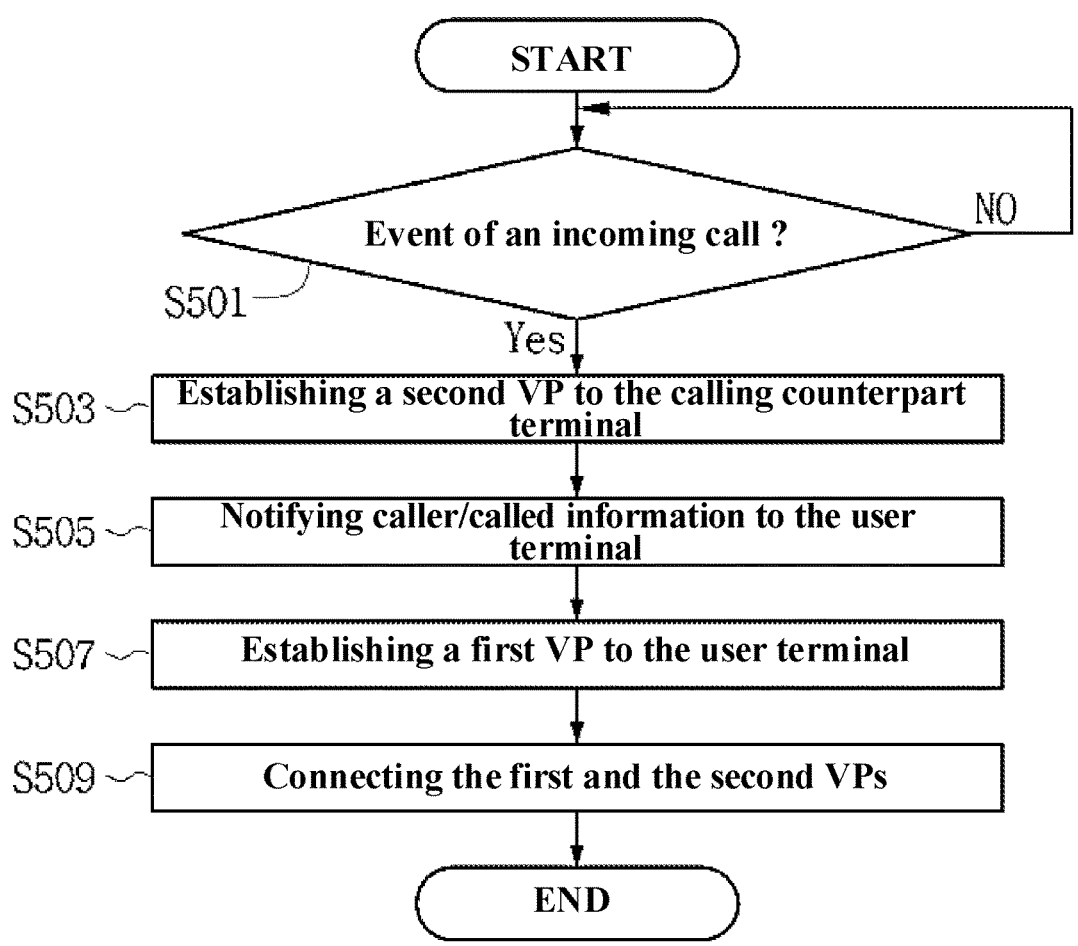
FIG. 5 is a flow chart of a method for voice communication control in an FMC system according to the second embodiment of the present invention.

FIG. 5 is a flow chart of a method for voice communication control in an FMC system according to another embodiment of the present invention. Being conducted by the incoming-call control device 230 of the FMC server 200 shown in FIGS. 1 and 2, the method illustrated in FIG. 5 will be described together with their operations.

If a voice call with an EMC extension phone number of the FMC terminal 300, which is a terminal of a subscriber of FMC service, as the called number is received over the voice telephone network 1 from a calling terminal at the other side, the second VP setting unit 231 of the incoming-call control device 210 in the FMC server 200 determines that an event of an incoming voice call to the FMC terminal 300 is generated (S501) and then establishes a second voice path between the terminal at the other side and the FMC server 200 (S503).

Subsequently, the call information notifier 233 notifies the FMC terminal 300, a called terminal, of caller/called information over the data network from the FMC server 200 (S505). The notified caller/called information includes a telephone number of the terminal at the other side, which is the calling part of the second voice path established in the step S503, and an FMC extension phone number as a called telephone number chosen by a caller at the other side. The first VP setting unit 235 establishes a first voice path between the FMC server 200 and the FMC terminal 300, a called terminal, over the voice telephone network 1 based on the corresponding caller/called information (S507).

As an example of the steps S505 to S507, a fact that an FMC extension phone number of the FMC terminal 300 is called by the calling terminal at the other side is notified to the FMC terminal 300 over the data network 3. As a result, another call comes to a telephone number of the FMC server 200 from the NTN of the FMC terminal 300 over the voice telephone network 1. Accepting the another call leads to establishment of the first voice path. As another example of those steps S505 to S507, while a call is being made from a telephone number of the FMC server 200 to the NTN of the FMC terminal 300 over the voice telephone network 1 to establish the first voice path, a fact that a call comes from the calling terminal at the other side to the FMC extension phone number of the FMC terminal 300 is notified to the FMC terminal 300 over the data network 3.

Finally, the VP connecting unit 237 of the incoming-call control device 230 in the FMC server 200 provides telephonic communication between the FMC terminal 300, which is the called part, and the calling terminal at the other side by making a connection between the second voice path established in the step S503 and the first voice path established in the step S507.

Figure 6:
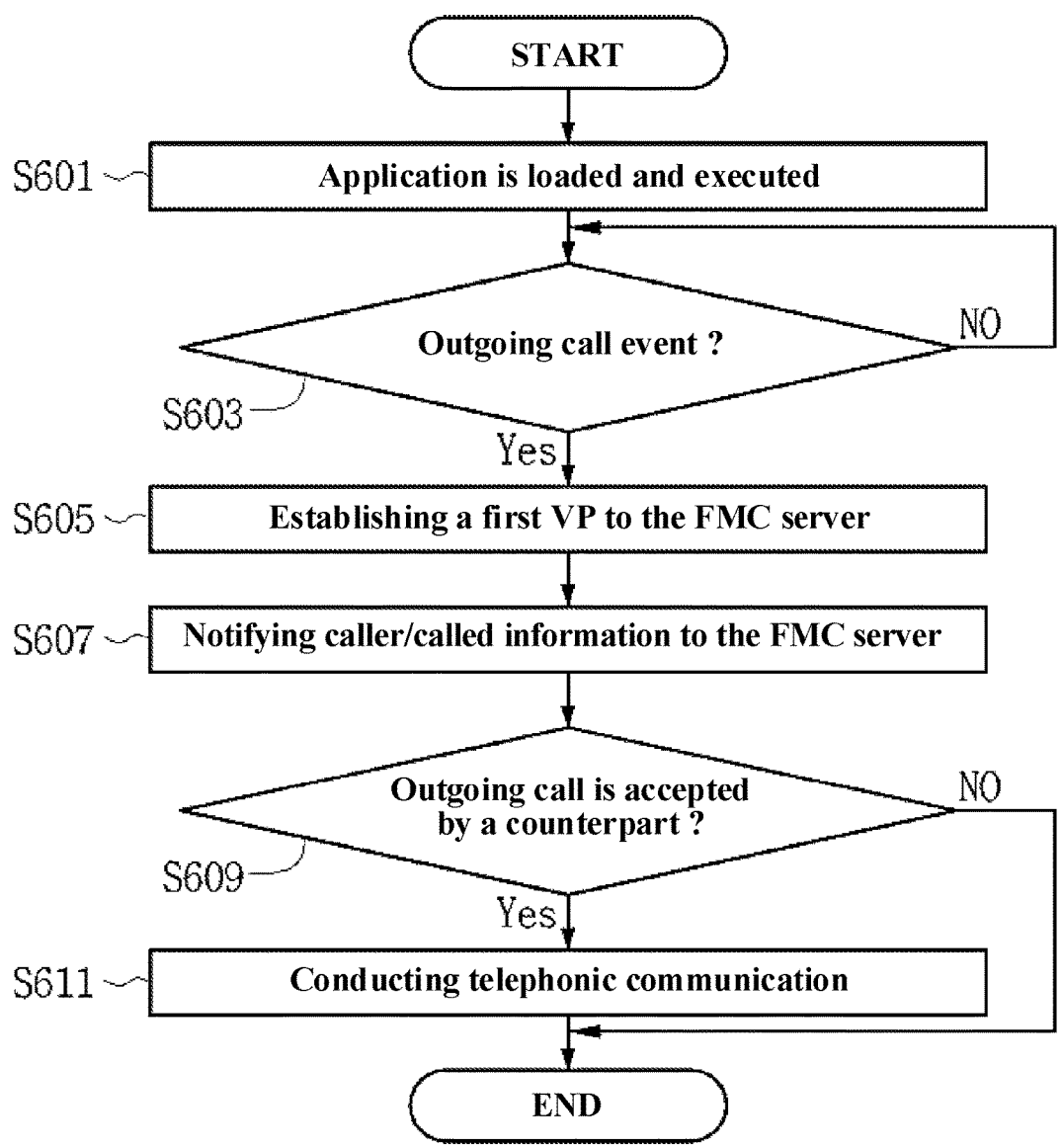
FIG. 6 is a flow chart of a method for voice communication control in an FMC system according to the third embodiment of the present invention.

FIG. 6 is a flow chart of a method for voice communication control in an FMC system according to another embodiment of the present invention. Being conducted by the outgoing-call control device 310 of the FMC terminal 300 shown in FIGS. 1 and 3, the method illustrated in FIG. 6 is described hereinafter together with their operations.

If an event of an outgoing voice call with an FMC extension phone number of the FMC terminal 300 as the calling number is generated (S603) as a user of the FMC terminal 300 uses an FMC app being executed in the FMC terminal (S601) to call a certain counterpart, the first VP setting unit 311 of the outgoing-call control device 310 in the FMC terminal 300 sets up a first voice path between the FMC terminal 300 and the FMC server 200 by making a voice call with the NTN of the FMC terminal 300 as the calling number and a telephone number of the FMC server 200 as the called number over the voice telephone network 1 (S605).

In the steps of S601 to S605, while the FMC terminal 300 conducts, as explained hereinbefore, management and history display, etc. on outgoing/incoming calls based on a calling FMC extension phone number of the FMC terminal 300 and a telephone number of the counterpart chosen actually by a user, it may execute the aforementioned establishment of the first voice path in background mode so that a user of the FMC terminal 300 can not notice the voice path establishing process.

Subsequently, the call information notifier 233 provides the FMC terminal 300, through the data network 3, with caller/called information that is corresponding to the event generated in the step S603 and includes the telephone number of the counterpart chosen actually by the user and the FMC extension phone number of the FMC terminal 300 (S607).

If the called counterpart accepts the call (S609), a second voice path is established between the FMC server 200 and the called terminal of the counterpart and the first and second voice paths are then connected each other as in the above-explained steps of S405 to S409. As a result, the call serving unit 315 conducts telephonic communication between the FMC terminal 300 and the called terminal of the counterpart.

Figure 7:
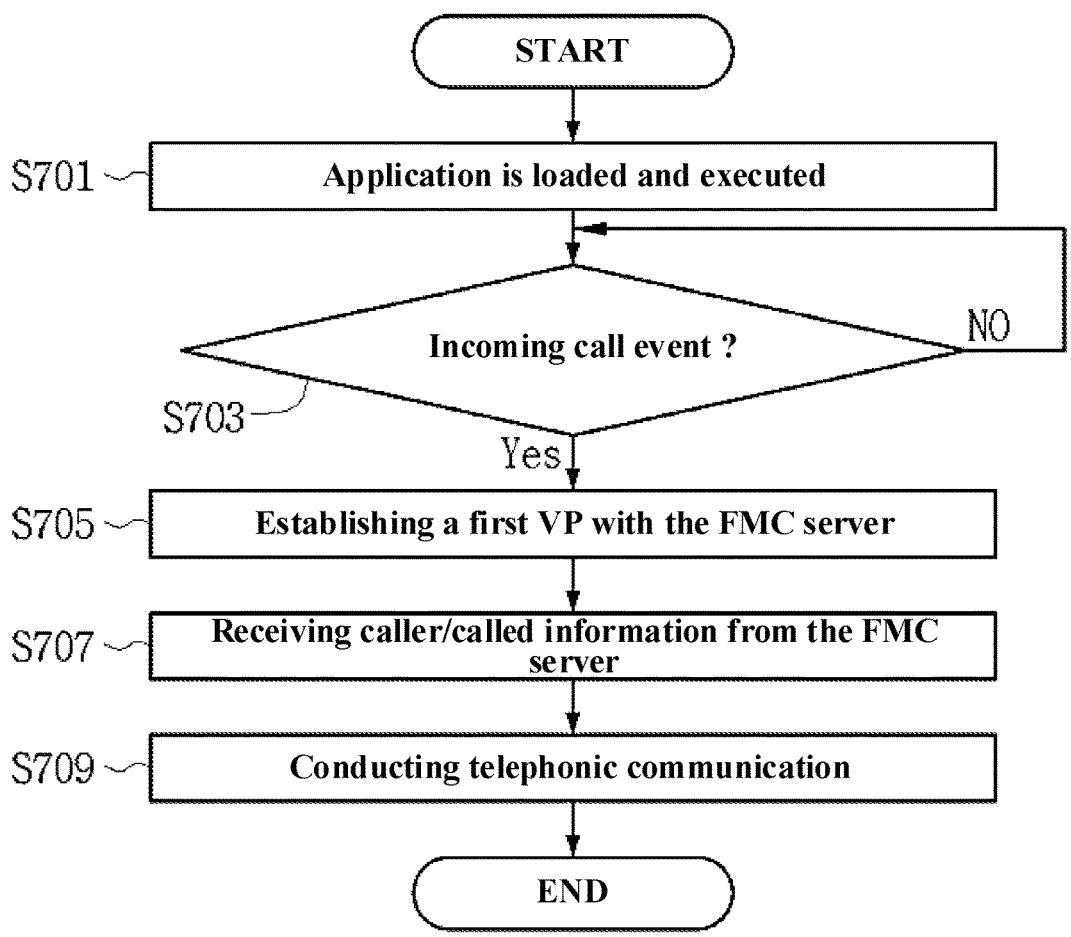
FIG. 7 is a flow chart of a method for voice communication control in an FMC system according to the fourth embodiment of the present invention.

FIG. 7 is a flow chart of a method for voice communication control in an FMC system according to another embodiment of the present invention. Being conducted by the incoming-call control device 330 of the FMC terminal 300 shown in FIGS. 1 and 3, the method illustrated as one example in FIG. 7 will be described along with their operations.

First, if an incoming call to the NTN of the FMC terminal 300 with the FMC app being executed (S701) is received from the FMC server 200 over the voice telephone network 1, the first VP setting unit 331 determines that an event of an incoming voice call is generated (S703), and sets up a first voice path between the FMC server 200 and the FMC terminal 300 by accepting the incoming call (S705).

At the same time, the call information receiver 333 is notified of a telephone number of a calling terminal at the other side and the FMC extension phone number of the FMC terminal 300 by the FMC server 200 through the data network 3. This notification enables the FMC terminal 300 to know that a counterpart terminal is calling the FMC extension phone number of the FMC terminal 200, so that management such as display of caller/called information chosen actually by a user of the calling terminal is possible (S707).

Finally, the call serving unit 335 conducts telephonic communication between the called FMC terminal 300 and the calling terminal at the other side (S709) through the first voice path, which is established between the FMC terminal 300 and the FMC server 200 in the step S705 by the first VP setting unit 331 over the voice telephone network 1, and the second voice path which is established between the FMC server 200 and the counterpart terminal over the voice telephone network 1 as in the above-explained step S503 in FIG. 5.

Figure 8:
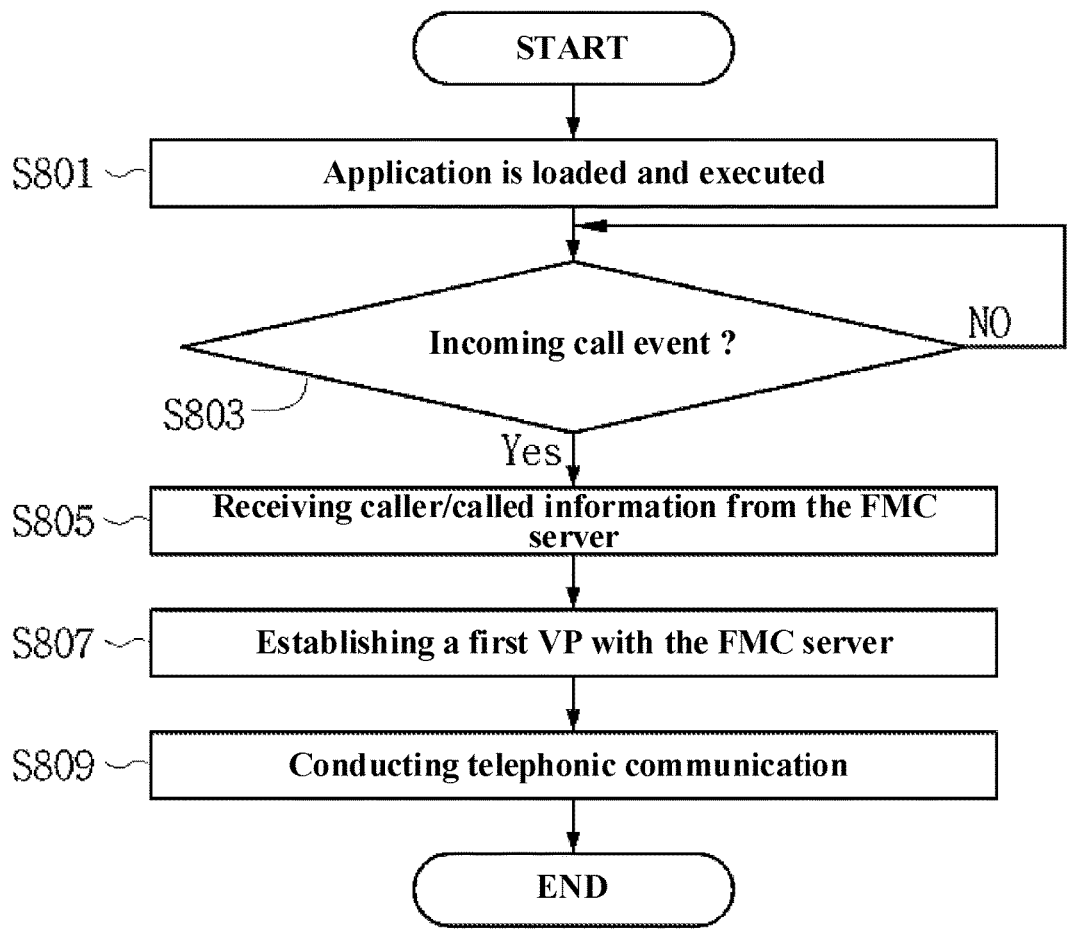
FIG. 8 is a flow chart of a method for voice communication control in an FMC system according to the fifth embodiment of the present invention.

FIG. 8 is a flow chart of a method for voice communication control in an FMC system according to another embodiment of the present invention. Being conducted by the incoming-call control device 330 of the FMC terminal 300 shown in FIGS. 1 and 3, the method illustrated as another example in FIG. 8 will be described along with their operations.

First, the FMC app is loaded and executed in the FMC terminal 300 (S801). Afterwards, if there is an event of an incoming call (S803), the call information receiver 333 acknowledges that a call is coming to an FMC extension phone number of the FMC terminal 300 (S805) after receiving call information, which is notified over the data network 3 by the FMC server 200, including a telephone number of a calling terminal at the other side and the FMC extension phone number of the FMC terminal 300.

As the result of the acknowledgement in the step S805, the first VP setting unit 331 sets up a first voice path between the FMC terminal 300 and the FMC server 200 by making a call with the NTN of the FMC terminal 300 as the calling part and a telephone number of the FMC server 200 as the called part over the voice telephone network 1.

Finally, the call serving unit 335 conducts telephonic communication between the called FMC terminal 300 and the calling counterpart terminal (S809) through the first voice path, which is established between the FMC terminal 300 and the FMC server 200 in the step S807 by the first VP setting unit 331 over the voice telephone network 1, and the second voice path which is established between the FMC server 200 and the counterpart terminal over the voice telephone network 1 as in the above-explained step S503 in FIG. 5.

The above-explained methods for controlling voice communication in an FMC system according to the variety of embodiments of the present invention can be embodied via a computer-readable recording medium (or applications) comprising program commands executable by a various types of computers. The computer-readable recording medium may comprise program commands, local data files, local data structure, etc. either alone or in combination. The recording medium may be what is specially designed and constructed for embodiments of the present invention or is known and used by those skilled in the field of computer software. Examples of the computer-readable recording medium include a magnetic medium such as hard disk, floppy disk and magnetic tape, an optical recording medium such as CD-ROM and DVD, a magneto-optical medium such as floptical disk, and a hardware device such as ROM, RAM, flash memory, etc. that is specifically configured to store and execute the program commands. The recording medium may be a transmission medium such as an optical or metal line, a wave guide, or the like including a carrier wave for transmitting a signal designating program commands, local data structures, or the like. Examples of program commands may include high-level language codes to be executed by a computer using an interpreter or the like as well as machine language codes such as those produced by a compiler.

As described above, according to various aspects of the present invention, when providing the FMC system to serve the FMC service, it is possible to efficiently control a communication path of voice calls originated from or received by a user terminal. That is, the FMC service can be controlled so that a voice path is established over a voice telephone network in which voice quality is guaranteed and call cost is relatively low compared to a data network as caller/called information is notified through a data network. Therefore, the call cost is remarkably reduced and the quality of voice calls is greatly improved in comparison with the conventional FMC system.

What is claimed is:

1. An apparatus, integrated in a fixed-mobile convergence (FMC) server, for establishing a voice path between a user terminal having a native telephone number (NTN) and an FMC extension phone number and a calling counterpart terminal, the apparatus comprising:
  a second voice path setting unit configured to accept a voice call originated from a telephone number of the calling counterpart terminal to the FMC extension phone number of the user terminal over a voice telephone network and establish a second voice path between the FMC server and the counterpart terminal;
  a call information notifier configured to notify the user terminal, through a data network, of the telephone number of the counterpart terminal;
  a first voice path setting unit configured to establish for establishing a first voice path between the user terminal and the FMC server over the voice telephone network by accepting another call to a telephone number of the FMC server from the NTN of the user terminal, the another call being generated, by the user terminal being called, in response to the notification of the telephone number of the counterpart terminal; and a voice-path connecting unit configured to connect the first voice path and the second voice path each other to provide telephonic communication between the user terminal being called and the calling counterpart terminal.

2. The apparatus of claim 1, wherein the call information notifier notifies the user terminal, through the data network, that a call comes to the FMC extension phone number of the user terminal from the counterpart terminal.

3. The apparatus of claim 2, wherein a calling number and a called number relating to the first voice path are the NTN of the user terminal and the telephone number of the FMC server, respectively.

4. A method, performed by a fixed-mobile convergence (FMC) server, for establishing a voice path between a user terminal having a native telephone number (NTN) and an FMC extension phone number and a calling counterpart terminal, the method comprising:

receiving a voice call originated from a telephone number of the calling counterpart terminal to the FMC extension phone number of the user terminal over a voice telephone network and establishing a second voice path between the FMC server and the counterpart terminal;

notifying the user terminal, through a data network, of the telephone number of the counterpart terminal as a calling number, and establishing a first voice path between the user terminal and the FMC server over the voice telephone network by accepting another call to a telephone number of the FMC server from the NTN of the user terminal, the another call being generated, by the user terminal being called, in response to the notification of the telephone number of the counterpart terminal; and connecting the first voice path and the second voice path each other to provide telephonic communication between the user terminal being called and the calling counterpart terminal.

* * * * *